United States Patent
Cho et al.

(10) Patent No.: US 9,929,387 B2
(45) Date of Patent: Mar. 27, 2018

(54) BATTERY MODULE

(71) Applicant: SAMSUNG SDI CO., LTD., Yongin-si, Gyeonggi-do (KR)

(72) Inventors: Jun-Woo Cho, Yongin-si (KR);
Tae-Yong Kim, Yongin-si (KR);
Jong-Han Rhee, Yongin-si (KR);
Shi-Dong Park, Yongin-si (KR);
Seong-Joon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 111 days.

(21) Appl. No.: 14/663,201

(22) Filed: Mar. 19, 2015

(65) Prior Publication Data

US 2015/0295214 A1    Oct. 15, 2015

(30) Foreign Application Priority Data

Apr. 9, 2014 (KR) .................. 10-2014-0042179

(51) Int. Cl.
*H01M 10/052* (2010.01)
*H01M 2/10* (2006.01)
*H01M 2/20* (2006.01)

(52) U.S. Cl.
CPC ......... *H01M 2/1077* (2013.01); *H01M 2/206* (2013.01); *H01M 2220/20* (2013.01)

(58) Field of Classification Search
CPC ................. H01M 10/052; H01M 10/0525
See application file for complete search history.

(56) References Cited

U.S. PATENT DOCUMENTS

| | | | | |
|---|---|---|---|---|
| 2008/0268335 | A1* | 10/2008 | Lin | H01M 2/0207 429/138 |
| 2009/0317703 | A1* | 12/2009 | Kwag | H01M 2/204 429/159 |
| 2010/0124693 | A1* | 5/2010 | Kosugi | G01R 31/3644 429/92 |
| 2011/0097614 | A1 | 4/2011 | Kim | |
| 2011/0159348 | A1* | 6/2011 | Park | H01M 2/1077 429/151 |
| 2012/0015227 | A1* | 1/2012 | Hwang | H01M 2/1022 429/99 |
| 2012/0114999 | A1 | 5/2012 | Park et al. | |
| 2015/0030894 | A1 | 1/2015 | Lee et al. | |

FOREIGN PATENT DOCUMENTS

| | | | | |
|---|---|---|---|---|
| KR | 10-2011-0044129 | | 4/2011 | |
| KR | 10-2012-0048261 | | 5/2012 | |
| WO | WO 2014003361 | A1 * | 1/2014 | ......... H01M 2/0217 |

* cited by examiner

*Primary Examiner* — Olatunji Godo
(74) *Attorney, Agent, or Firm* — Lewis Roca Rothgerber Christie LLP

(57) ABSTRACT

A battery module includes a plurality of battery cells aligned along one direction, each of the plurality of battery cells including terminals at first surfaces of the battery cells. A holder is on the first surfaces of the battery cells and has a groove. A frame surrounds side surfaces adjacent to the first surfaces of the battery cells and includes a first bent portion that is at least partially inserted into the groove.

19 Claims, 6 Drawing Sheets

BATTERY MODULE

CROSS-REFERENCE TO RELATED APPLICATION

This application claims priority to and the benefit of Korean Patent Application No. 10-2014-0042179, filed on Apr. 9, 2014 in the Korean Intellectual Property Office, the contents of which are incorporated herein by reference in their entirety.

BACKGROUND

1. Field

Aspects of embodiments of the present invention relates to a battery module.

2. Description of the Related Art

Recently, a high-output battery module having high-energy density and using a non-aqueous electrolyte has been developed. Such a high-output battery module is implemented to have a high voltage or a high capacity by coupling (e.g., connecting) a plurality of battery cells in parallel or in series so as to be used, for example, to drive a motor of a device requiring high power, such as an electric vehicle.

As a number of devices employing such a battery module increases, research into improved production of the battery module is conducted. Further, as the appearance of the devices is diversified, it is also desirable to diversify the shape of the battery module. However, first of all, the battery module should have safety. Thus, research into a structure of the battery module which is capable of satisfying all of the above-mentioned conditions has been conducted.

SUMMARY

Accordingly, an aspect of the present invention is to provide a novel battery module which can be more efficiently produced and has improved safety.

According to an embodiment of the present invention, a battery module includes a plurality of battery cells aligned along one direction, each of the plurality of battery cells including terminals at first surfaces of the battery cells, a holder on the first surfaces of the battery cells and having a groove, and a frame that surrounds side surfaces adjacent to the first surfaces of the battery cells and includes a first bent portion that is at least partially inserted into the groove.

The frame may further include a frame body adjacent to the side surfaces of the battery cells, and the first bent portion may be bent and extend from a first edge of the frame body.

The first bent portion may be bent twice from the first edge of the frame body.

The first bent portion may include a first extension bent from the first edge of the frame body and extending in a direction towards the groove, and a second extension bent from the first extension and extending in a direction opposite to the extension direction of the first extension.

The frame may further include a second bent portion bent and extending from a second edge of the frame body opposite to the first edge of the frame body.

The second bent portion may be bent and extend from the frame body to be on second surfaces of the battery cells that are opposite to the first surfaces of the battery cells.

The groove may open in a direction normal to the side surface of the battery cells.

At least a portion of the first bent portion may be press-fit into the groove.

The battery module may further include an elastic member between the battery cells and the holder.

At least a portion of the elastic member may be under the first bent portion of the frame such that the elastic member and the first bent portion are at opposite sides of at least a portion of the holder.

The battery module may further include busbars configured to electrically couple the battery cells to each other, and the holder may be configured to align the busbars.

The holder may further include a hook at an opening of the groove, and the hook may be configured to prevent the frame from being removed from the holder.

The hook may have an inclined surface inclined in an insertion direction of the first bent portion into the groove and has another surface perpendicular to the insertion direction and opposite to the inclined surface.

The first bent portion may include a first extension and a second extension that is bent from the first extension and extends in a direction opposite to an extension direction of the first extension, and an end of the second extension may face the other surface of the hook.

The frame may further include an insulating member, the insulating member being at an inner surface of at least a portion of the frame that faces the battery cells.

The frame may further include a frame body adjacent to at least a portion of the side surfaces of the battery cells, a first bent portion bent and extending from a first edge of the frame body, and a second bent portion bent and extending from a second edge of the frame body that is opposite to the first edge, the second bent portion being on second surfaces of the battery cells that are opposite to the first surfaces, and the insulating member may be between the frame body and the side surfaces of the battery cells and between the second bent portion and the second surfaces of the battery cells.

Other features and aspects of the invention will become apparent from the following description taken in connection with the accompanying drawings.

The terminologies or words used in the description and the claims of the present invention should not be interpreted as being limited merely to common and dictionary meanings. The terminologies or words used herein should be interpreted based on the meanings and concepts of the invention in keeping with the scope of the invention on the basis of the principle that the inventor(s) can appropriately define the terms in order to describe the invention in the best way.

As is apparent from the above description, the present invention is directed toward a frame including a first bent portion that is coupled to a groove in a holder without using a bolt and/or a nut, thus reducing the number of components and thereby improving the production efficiency and safety of the battery module.

BRIEF DESCRIPTION OF THE DRAWINGS

Example embodiments of the present invention will now be described more fully hereinafter with reference to the accompanying drawings; however, the present invention may be embodied in different forms and should not be construed as limited to the embodiments set forth herein. Rather, these example embodiments are provided so that this disclosure will be thorough and complete and will fully convey the scope of the example embodiments to those skilled in the art.

In the figures, dimensions may be exaggerated for clarity of illustration. It will be understood that when an element is referred to as being "between" two elements, it can be the FIG. 1 is a perspective view showing a battery module according to an embodiment of the present invention.

DETAILED DESCRIPTION

Figure 1:
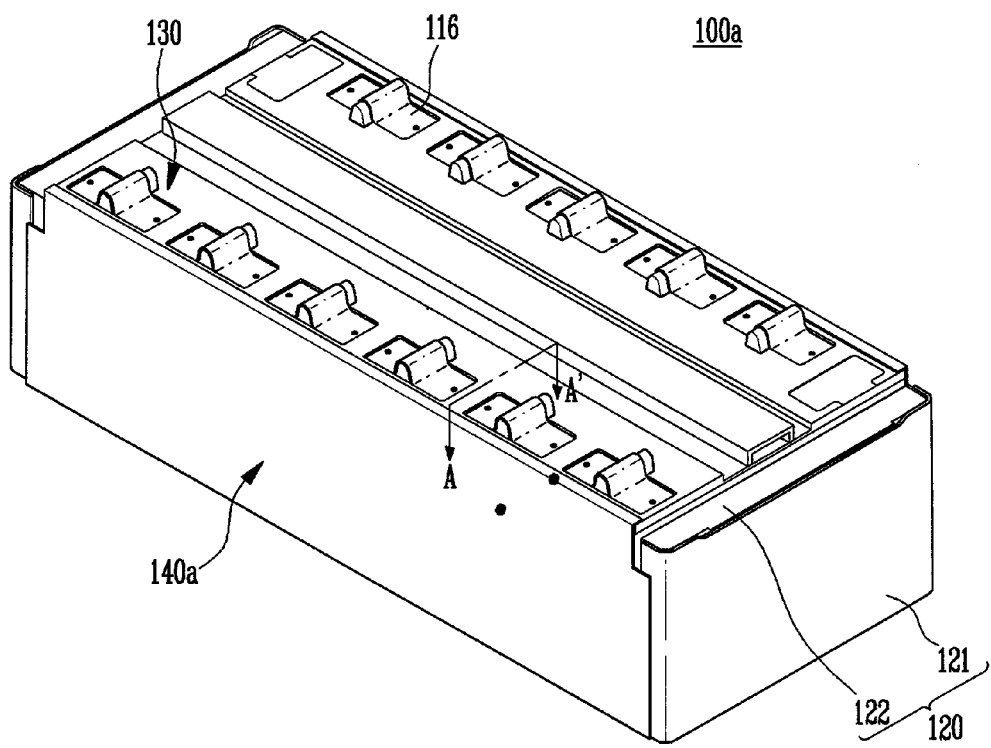

The present invention will be described more fully hereinafter with reference to the accompanying drawings, in which example embodiments of the inventions are shown. Further, like reference numerals are used to identify like elements throughout different drawings. While example embodiments of the invention will be described using specific terms, such descriptions are for illustrative purposes only, and it is to be understood that changes and variations may be made to these embodiments without departing from the spirit or scope of the present invention as defined by the following claims and their equivalents. In the following description, if it is decided that the detailed description of a known function or configuration related to the invention makes the subject matter of the invention unclear, the detailed description thereof may be omitted. Further, when a first element is described as being "coupled" or "connected" to a second element, the first element may be directly coupled or connected to the second element or the first element may be indirectly coupled or connected to the second element via one or more intervening elements. Even further, the use of "may" when describing embodiments of the present invention is directed toward "one or more embodiments of the present invention."

Hereinafter, example embodiments of the present invention will be described in detail with reference to the accompanying drawings.

Figure 2:
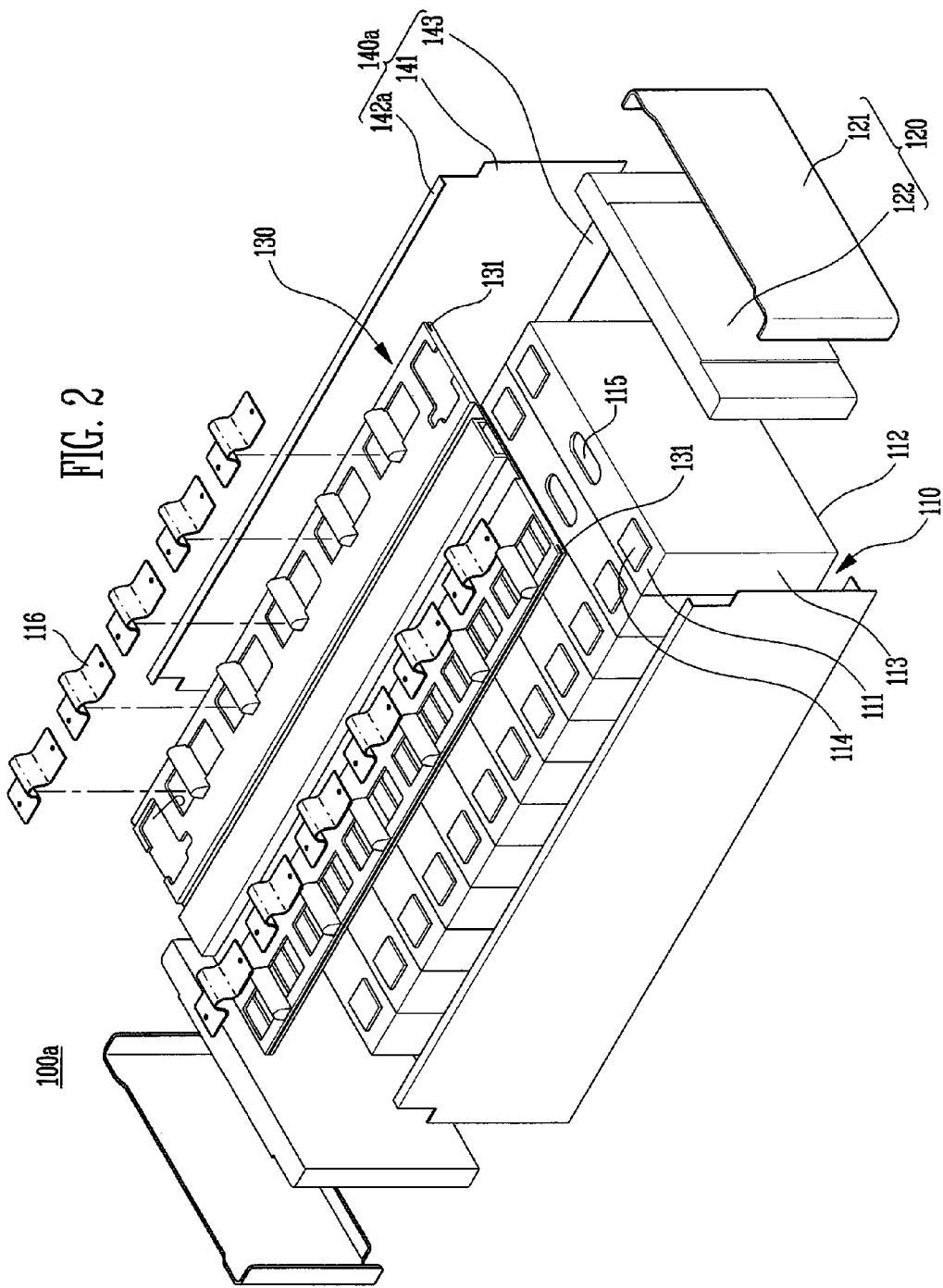
FIG. 2 is an exploded perspective view of the battery module shown in FIG. 1.

FIG. 1 is a perspective view showing a battery module 100*a* according to an embodiment of the present invention, and FIG. 2 is an exploded perspective view of the battery module 100*a* shown in FIG. 1. The battery module 100*a* according to this embodiment will be described below with reference to the accompanying drawings.

As shown in FIGS. 1 and 2, the battery module 100*a* according to this embodiment may include a plurality of battery cells 110, a holder 130 placed on first surfaces 111 of the battery cells 110, and a frame 140*a* configured such that at least a portion thereof surrounds side surfaces 113 of the battery cells 110. A first bent portion 142*a* of the frame 140*a* may be inserted into a groove 131 of the holder 130 to couple the frame 140*a* to the holder 130.

The battery cells 110 are energy storage and releasing members. The plurality of battery cells 110 may be aligned along one direction.

Each battery cell 110 may include a battery case that is open at the first surface 111. Each battery cell 110 may further include an electrode assembly and an electrolyte that are accommodated in the battery case. The electrode assembly and the electrolyte may electrochemically react with each other, thus storing and releasing energy. Such a battery case may be sealed at the first surface 111 of the battery cell 110 by having a cap assembly thereon, for example. Further, terminals 114 having different polarities, namely, a positive terminal and a negative terminal, may be provided on the first surface 111 of each of the battery cells 110 in such a way as to protrude therefrom. Each battery cell 110 may further include a vent 115 as a safety device, the vent 115 serving as a passage for discharging excess gas out of the battery cell 110.

Further, the plurality of battery cells 110 may be aligned along one direction. This alignment may be realized by a pair of end units 120 that are provided outside (e.g., adjacent) the widest surfaces of the outermost battery cells 110 from among the plurality of battery cells 110. In this regard, each end unit 120 may include an end plate 121 and an end block 122. The end plate 121 may be made of, for example, metal to provide sufficient rigidity to the battery module 100*a*. Because the end block 122 is positioned between the end plate 121 and the outermost battery cell 110, the end block 122 may be made of an insulating material so as to prevent an unwanted short circuit from occurring between the end plate 121 and the outermost battery cell 110.

The plurality of battery cells 110 may be electrically coupled to (e.g., electrically connected to) each other via busbars 116. In this regard, the busbars 116 may couple (e.g., connect) the terminals 114 of neighboring battery cells 110 to each other, thus implementing a series or parallel electric connection. The busbars 116 may be secured to the terminals 114 by welding, bolting, or the like. Further, the busbars 116 may be aligned and held at a given position by the holder 130.

The holder 130 serves to align the busbars 116 and may be positioned on the first surface 111 through which the terminal 114 of each of the battery cells 110 is exposed.

In one embodiment, the holder 130 may be made of an insulating material to prevent a short circuit from occurring between the holder 130 and the battery cell 110. For example, the holder 130 is provided with an opening (e.g., a hole) or the like such that the busbar 116 may be seated therein. Further, the holder 130 may be formed to have a size sufficient to cover all of the first surfaces 111 of the battery cells 110.

The groove 131 may be formed in the holder 130. The groove 131 may be formed along (e.g., may extend along) a side surface of the holder 130 to have a length corresponding to the length of all of the side surfaces 113 of the plurality of battery cells 110. Further, the groove 131 may be open in a direction parallel to a direction normal to the side surface 113 of each battery cell 110. That is, the groove 131 may be formed in the side surface of the holder 130 in such a way that its open area faces outwards (e.g., outwards from the plurality of battery cells 110).

Figure 3:
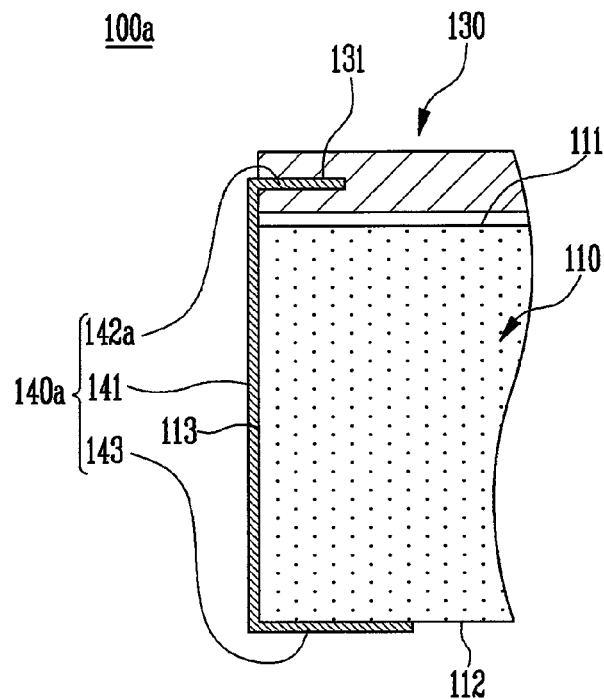
FIG. 3 is a sectional view of the battery module taken along the line A-A' of FIG. 1.

FIG. 3 is a sectional view of the battery module 100*a* taken along the line A-A' of FIG. 1. Hereinafter, the frame 140*a* of battery module 100*a* according to this embodiment will be described with reference to FIG. 3.

The frame 140*a* is a member that is configured such that at least a portion thereof surrounds the side surfaces 113 of the battery cells 110 that are adjacent to the first surfaces 111 of the battery cells 110. In one embodiment, the frame 140*a* may be formed to have a size approximately corresponding to all of the side surfaces 113 of the plurality of battery cells 110. For example, the frame 140a may include a frame body 141 positioned adjacent to the side surfaces 113 of the plurality of battery cells 110 and a first bent portion 142a and a second bent portion 143 that are bent and extend from opposite edges of the frame body 141. Each of the first bent portion 142a and the second bent portion 143 may be bent at an angle of about 90° with respect to the frame body 141. Consequently, the frame 140a has a 'U' shape and, thus, at least partially surrounds the first surfaces 111, the side surfaces 113, and second surfaces 112 opposite to the first surfaces 111 of the battery cells 110.

The first bent portion 142a may be bent from a first edge of the frame body 141 in such a way as to be parallel to the first surface 111 of each battery cell 110 or to face the holder 130 placed on the first surface 111. The first bent portion 142a may be at least partially inserted into the groove 131 formed in the holder 130. Further, the first bent portion 142a may be coupled to the groove 131 through, for example, mechanical press fitting or snap fitting. By fitting the first bent portion 142a into the groove 131, the frame 140a may be coupled to the holder 130. In this regard, the coupling of the first bent portion 142a with the groove 131 is performed as follows: for example, the width of the groove 131 is designed to be slightly smaller than the thickness of the first bent portion 142a and the first bent portion 142a is coupled to the groove 131 through press fitting.

The second bent portion 143 may be bent from a second edge of the frame body 141 in such a way as to extend in a direction parallel to the second surfaces 112 of the plurality of battery cells 110. Thus, at least a portion of the second surfaces 112 of the battery cells 110 may be surrounded by the second bent portion 143 so as to be protected from the outside. Because the frame 140a includes both the first bent portion 142a and the second bent portion 143, the frame 140a may cover (e.g., hold) both the first surfaces 111 and the second surfaces 112 of the battery cells 110. This may further increase a coupling force of the holder 130 and the frame 140a and prevent the plurality of battery cells 110 from undesirably moving, thus improving the safety of the battery module 100a.

As described above, the first bent portion 142a and the second bent portion 143 may be bent from the frame body 141 at about 90°. However, such a bent state can be observed in finished product. During the manufacture of the frame 140a, an angle between the first bent portion 142a and the frame body 141 and an angle between the second bent portion 143 and the frame body 141 may be less than about 90°. Because the angle between the first bent portion 142a and the frame body 141 and the angle between the second bent portion 143 and the frame body 141 is each about 90° in the finished product, an elastic repulsive force may be generated in the first bent portion 142a and the second bent portion 143. Thus, the first bent portion 142a is press-fitted into the groove 131 and the second bent portion 143 is press-fitted onto the second surfaces 112 of the battery cells 110 using the elasticity of the frame 140a, thus further increasing a coupling force between the holder 130, the battery cells 110, and the frame 140a and thereby improving the safety of the battery module 100a. However, the present invention is not limited thereto, and each of the first bent portion 142a and the second bent portion 143 may be designed to form an obtuse angle with the frame body 141. In this case, the frame 140a is coupled to the holder 130 not by a bolt/nut fastening method but by a mechanical fitting method, so that a relatively small space may be required to couple the frame 140a to the holder 130 and the miniaturization and lightness of the battery module 100a can be achieved. Further, the number of required components is reduced, thus reducing manufacturing cost and improving production efficiency.

Figure 4:
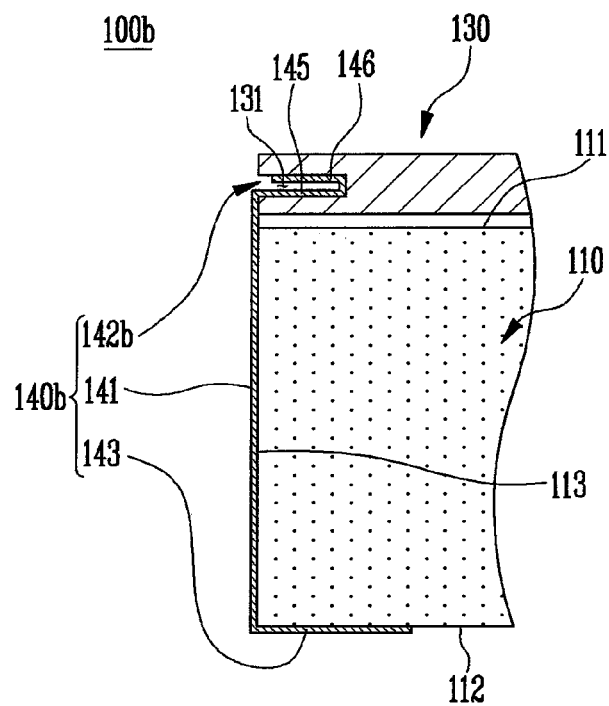
FIG. 4 is a sectional view showing a battery module according to another embodiment of the present invention.

FIG. 4 is a sectional view showing a battery module 100b according to another embodiment of the present invention. Hereinafter, the battery module 100b according to this embodiment will be described with reference to FIG. 4. The duplicated description of elements common to both embodiments may be omitted herein.

As shown in FIG. 4, the battery module 100b according to this embodiment includes battery cells 110, a holder 130 having a groove 131, and a frame 140b having a first bent portion 142b. The first bent portion 142b may have a shape that is bent twice. For example, the first bent portion 142b may include a first extension 145 that is bent from the frame body 141 in such a way as to extend towards the groove 131 of the holder 130 and a second extension 146 that is bent from the first extension 145 in such a way as to extend in a direction opposite to the first extension 145.

In the preceding embodiment, because the first bent portion 142a is coupled to the groove 131 of the holder 130, stress may be concentrated on the first bent portion 142a, thus causing the first bent portion 142a to undergo fatigue damage. In order to reduce such an occurrence, according to the embodiment shown in FIG. 4, the first bent portion 142b may be formed to be at least twice as thick as the frame body 141 and the second bent portion 143, thus increasing the rigidity of the first bent portion 142b where stress is concentrated.

Figure 5:
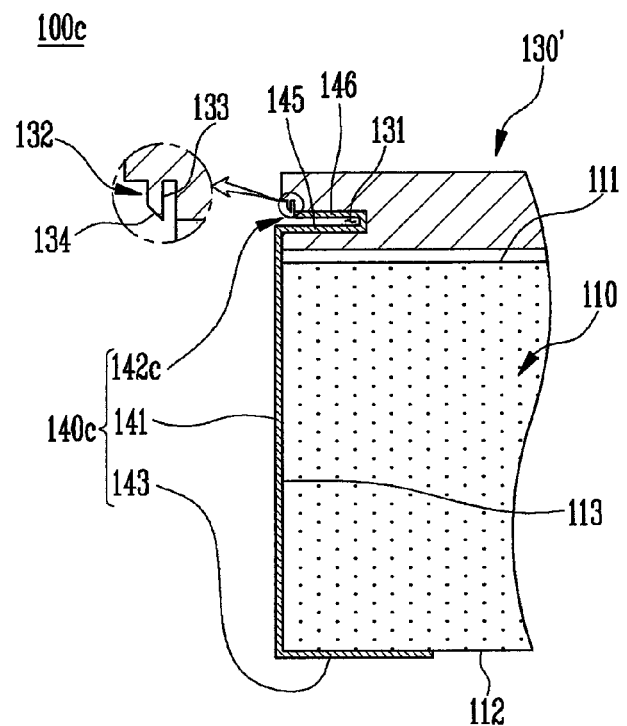
FIG. 5 is a sectional view showing a battery module according to another embodiment of the present invention.

FIG. 5 is a sectional view showing a battery module 100c according to another embodiment of the present invention. Hereinafter, the battery module 100c according to this embodiment will be described with reference to FIG. 5. The duplicated description of elements common to embodiments may be omitted herein.

As shown in FIG. 5, the battery module 100c according to this embodiment includes battery cells 110, a holder 130' having a groove 131, and a frame 140c having a first bent portion 142c. A hook 132 may be positioned in an open area (e.g., an opening) of the groove 131 of the frame 140c. In this regard, the hook 132 may be shaped to partially close the groove 131 (e.g., to partially close or restrict an opening of the groove 131), thus preventing the frame 140c from being removed from the holder 130'.

For example, the hook 132 may be configured such that its surface positioned in the insertion direction of the first bent portion 142c into the groove 131, namely, a second surface 134 opposite to a first surface 133 facing the groove 131, is inclined, and a surface opposite to the inserting direction of the first bent portion 142c, namely, the first surface 133 facing the groove 131, is vertical. Thus, when the first bent portion 142c is inserted into the groove 131, the first bent portion 142c may be easily inserted along the inclined second surface 134. After the insertion has been completed, the first bent portion 142c is stopped by the vertical first surface 133 of the hook 132, thus preventing the removal of the frame 140c from the holder 130'. Further, when the first bent portion 142c includes a first extension 145 and a second extension 146, an end of the first bent portion 142c may be an end of the second extension 146, and an end of the second extension 146 may face or come into contact with the vertical first surface 133 of the hook 132, thus preventing the removal of the first bent portion 142c from the holder 130'. Therefore, the frame 140c can be more firmly coupled to the holder 130'. The second extension 146 may be bent upwards or downwards relative to the first extension 145. When the hook 132 is located above the first bent portion 142c as shown in FIG. 5, the second extension 146 is bent upwards relative to the first extension 145. When the hook 132 is located under the first bent portion 142c, the second extension 146 may be bent downwards relative to the first extension 145, so that an end of the second extension 146 faces or comes into contact with the vertical first surface 133 of the hook 132.

Figure 6:
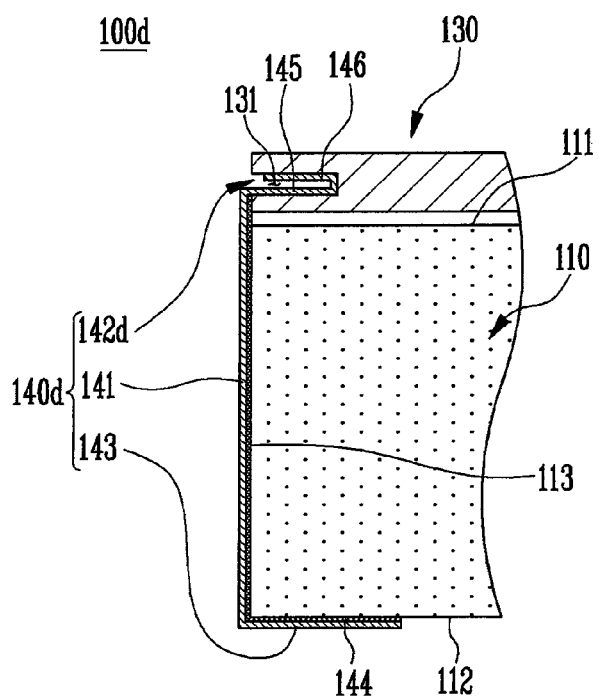
FIG. 6 is a sectional view showing a battery module according to yet another embodiment of the present invention.

FIG. 6 is a sectional view showing a battery module 100d according to yet another embodiment of the present invention. Hereinafter, the battery module 100d according to this embodiment will be described with reference to FIG. 6. The duplicated description of elements common to embodiments may be omitted herein.

As shown in FIG. 6, the battery module 100d according to this embodiment includes battery cells 110, a holder 130 having a groove 131, and a frame 140d having a first bent portion 142d. The frame 140d may include an insulating member 144. When the frame 140d is made of a conductor, such as metal, the frame 140d may come into contact with the battery cells 110, thus undesirably causing a short circuit. In order to prevent such a short circuit, according to this embodiment, the frame 140d may include the insulating member 144. To be more specific, the insulating member 144 may be at least partially provided on an inner surface of the frame 140d facing the battery cells 110. Because an area of the frame 140d at which the first bent portion 142d is formed comes into contact with the insulating holder 130, there is little or no risk of the short circuit. Hence, the insulating member 144 may be positioned between the frame body 141 of the frame 140d and the side surface 113 of the battery cells 110 and/or between the second bent portion 143 of the frame 140d and the second surface 112 of the battery cells 110, thus allowing the frame 140d to be effectively insulated from the battery cell 110.

Figure 7:
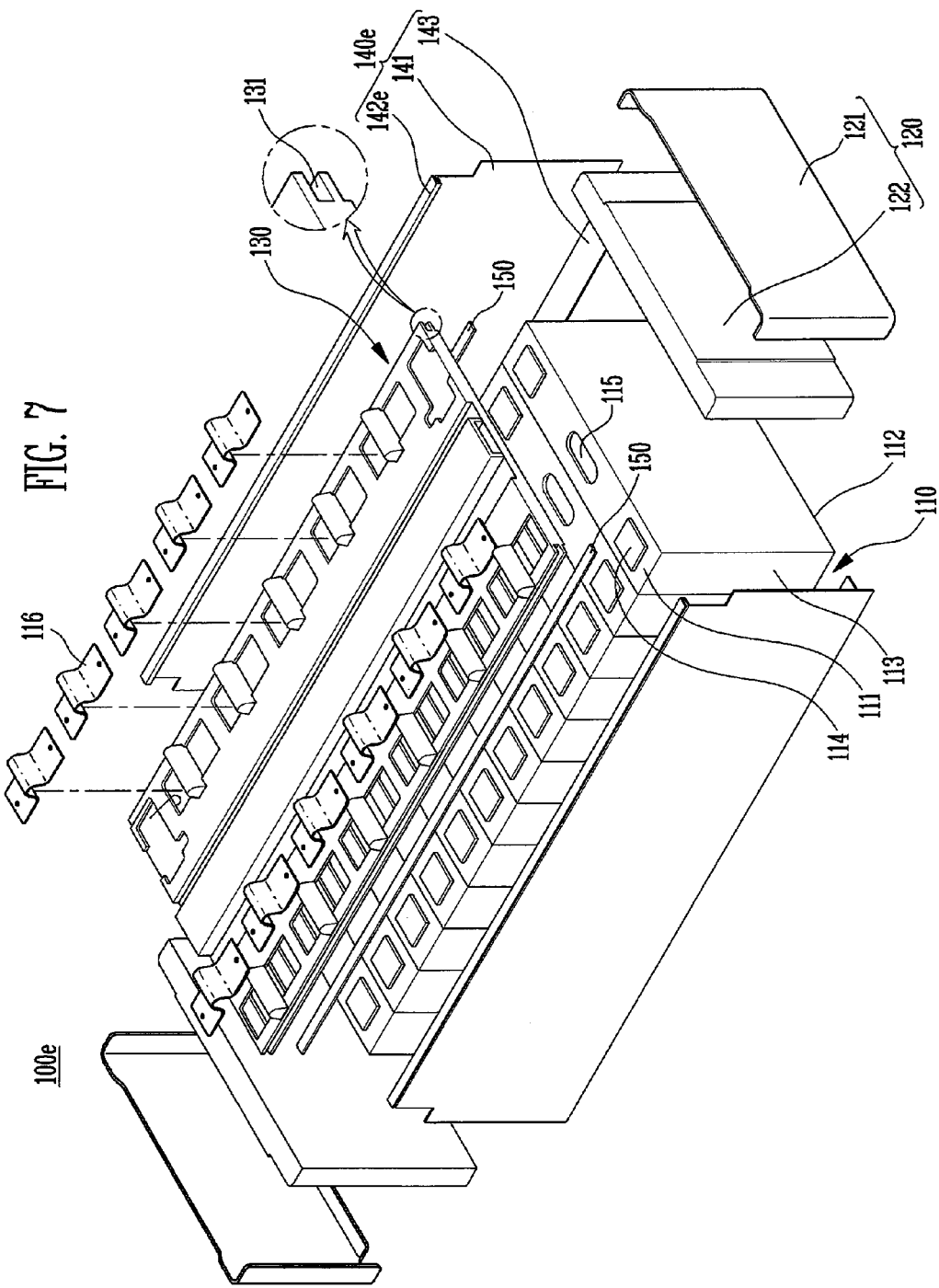
FIG. 7 is an exploded perspective view showing a battery module according to a still another embodiment of the present invention.
Figure 8:
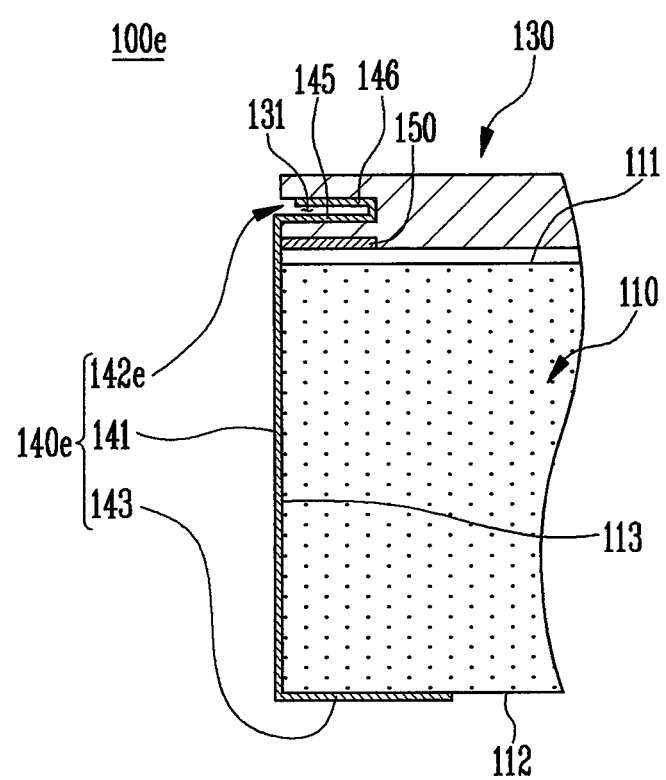
FIG. 8 is a sectional view of the battery module shown in FIG. 7.

FIG. 7 is an exploded perspective view showing a battery module 100e according to another embodiment of the present invention, and FIG. 8 is a sectional view of the battery module 100e shown in FIG. 7. Hereinafter, the battery module 100e according to this embodiment will be described with reference to FIGS. 7 and 8. The duplicated description of elements common to embodiments may be omitted herein.

As shown in FIGS. 7 and 8, the battery module 100e according to this embodiment includes battery cells 110, a holder 130 having a groove 131, and a frame 140e having a first bent portion 142e. An elastic member 150 may be further provided between the battery cells 110 and the holder 130. In one embodiment, the elastic member 150 may bias the holder 130 upwards using an elastic force or a repulsive force. Thus, such an elastic or repulsive force may be transmitted to the first bent portion 142e coupled to the groove 131 of the holder 130. The frame 140e includes a first bent portion 142e and a second bent portion 143 such that the frame 140e has approximately a "U" shape. Thus, the frame 140e may be more firmly coupled to the holder 130 using the elastic force of the frame 140e itself and the elastic force or repulsive force of the elastic member 150.

In order to increase or maximize such a coupling force, the elastic member 150 may extend long along the first surfaces 111 of the plurality of battery cells 110 in a similar manner as the frame 140e. The first bent portion 142e of the frame 140e may be provided directly above at least a portion of the elastic member 150 in such a way that the first bent portion 142e and the elastic member 150 are located on opposite sides of a portion of the holder 130. That is, the elastic member 150 may be positioned directly under an area at which the first bent portion 142e is coupled to the groove 131 of the holder 130. Thus, the elastic member 150 may effectively transmit the repulsive force or elastic force to the first bent portion 142e, thus allowing the holder 130 to be more firmly coupled to the frame 140e.

Example embodiments of the present invention have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made to these example embodiments without departing from the spirit and scope of the present invention as set forth in the following claims and their equivalents.

What is claimed is:

1. A battery module comprising:
   a plurality of battery cells aligned along one direction, each of the plurality of battery cells comprising terminals at first surfaces of the battery cells;
   a holder on the first surfaces of the battery cells, and defining holes to respectively expose the terminals of the battery cells, the holder having a groove; and
   a frame extending from below second surfaces of the battery cells opposite the first surfaces to over the first surfaces of the battery cells to surround side surfaces adjacent to the first surfaces of the battery cells, the frame comprising a first bent portion that is at least partially inserted into the groove.

2. The battery module of claim 1, wherein, the frame further comprises a frame body adjacent to the side surfaces of the battery cells, and
   wherein the first bent portion is bent and extends from a first edge of the frame body.

3. The battery module of claim 2, wherein the first bent portion is bent twice from the first edge of the frame body.

4. The battery module of claim 2, wherein the first bent portion comprises:
   a first extension bent from the first edge of the frame body and extending in an extension direction from the first edge of the frame body towards the groove; and
   a second extension bent from the first extension and extending from an end of the first extension toward the first edge of the frame body in a direction opposite to the extension direction of the first extension to overlap the first extension.

5. The battery module of claim 2, wherein the frame further comprises a second bent portion bent and extending from a second edge of the frame body opposite to the first edge of the frame body.

6. The battery module of claim 5, wherein the second bent portion is bent and extends from the frame body to be on the second surfaces of the battery cells that are opposite to the first surfaces of the battery cells.

7. The battery module of claim 1, wherein the groove opens in a direction normal to the side surfaces of the battery cells.

8. The battery module of claim 1, wherein at least a portion of the first bent portion is press-fit into the groove.

9. The battery module of claim 1, further comprising an elastic member between the battery cells and the holder.

10. The battery module of claim 9, wherein at least a portion of the elastic member is under the first bent portion of the frame such that the elastic member and the first bent portion are at opposite sides of at least a portion of the holder.

11. The battery module of claim 1, further comprising busbars configured to electrically couple the battery cells to each other,
wherein the holder is configured to align the busbars.

12. The battery module of claim 1, wherein the holder further comprises a hook at an opening of the groove, and
wherein the hook is configured to prevent the frame from being removed from the holder.

13. The battery module of claim 12, wherein the hook has an inclined surface inclined in an insertion direction of the first bent portion into the groove, and has another surface perpendicular to the insertion direction and opposite to the inclined surface.

14. The battery module of claim 13, wherein the first bent portion comprises a first extension and a second extension that is bent from the first extension and extends in a direction opposite to an extension direction of the first extension, and
wherein an end of the second extension faces the other surface of the hook.

15. The battery module of claim 13, wherein the frame further comprises an insulating member, the insulating member being at an inner surface of at least a portion of the frame that faces the battery cells.

16. The battery module of claim 15, wherein the frame further comprises:
a frame body adjacent to at least a portion of the side surfaces of the battery cells;
a first bent portion bent and extending from a first edge of the frame body; and
a second bent portion bent and extending from a second edge of the frame body that is opposite to the first edge, the second bent portion being on the second surfaces of the battery cells that are opposite to the first surfaces, and
wherein the insulating member is between the frame body and the side surfaces of the battery cells and between the second bent portion and the second surfaces of the battery cells.

17. The battery module of claim 1, wherein the first bent portion is over the first surfaces of the battery cells.

18. A battery module comprising:
a plurality of battery cells aligned along one direction, each of the plurality of battery cells comprising terminals at first surfaces of the battery cells;
a frame covering side surfaces of the battery cells, the side surfaces being adjacent to the first surfaces of the battery cells, the frame comprising a first bent portion bent to extend toward the battery cells; and
a holder on the first surfaces of the battery cells, and defining holes to respectively expose the terminals of the battery cells, the holder having a groove extending along the holder in the one direction and extending into the holder in a direction normal to the side surfaces of the battery cells, the first bent portion of the frame being at least partially inserted into the groove.

19. The battery module of claim 1, wherein the frame comprises metal.

* * * * *